United States Patent [19]

Verhulst et al.

[11] Patent Number: 4,923,283

[45] Date of Patent: May 8, 1990

[54] ELECTROSCOPIC FLUID DISPLAY

[75] Inventors: Antonius G. H. Verhulst; Jacob Bruinink; Emanuel J. W. M. Lenders, all of Eindhoven, Netherlands

[73] Assignee: U.S. Philips Corporation, New York, N.Y.

[21] Appl. No.: 191,298

[22] Filed: May 6, 1988

[30] Foreign Application Priority Data

May 7, 1987 [NL] Netherlands ........................ 8701072

[51] Int. Cl.$^5$ .............................................. G02B 26/02

[52] U.S. Cl. .................................... 350/269; 340/763; 350/266

[58] Field of Search ............... 350/266, 267, 269, 486; 340/378, 763

[56] References Cited

U.S. PATENT DOCUMENTS 4,178,077 12/1979 Te Velde ........................... 350/269

*Primary Examiner*—P. M. Dzierzynski
*Attorney, Agent, or Firm*—Paul R. Miller

[57] ABSTRACT

An electroscopic fluid display comprises substrates (1, 2) having fixed electrodes (12, 22), and movable electrodes (3) between the substrates, the electrodes (12, 22, 3) being provided on the free main surfaces with an insulating layer (13, 23, 31, 32) respectively, and the asymmetry of the alternating voltage drive for the electrodes being adapted to the difference in surface properties as regards charge delivery and charge adsorption of facing insulating layers (13, 31; 32, 23), or the alternating voltage drive is symmetrical, and facing insulating layers (13, 31; 32, 23) have substantially the same surface properties as regards charge delivery and charge adsorption. The insulating layer (31, 32) consists, preferably, on at least one main surface of the movable electrode (3) of anodized electrode material and continuing along (33) the outer peripheral and inner peripheral portions of the perforated movable electrode 3. The insulating layer on the substrate (1, 2) opposite the insulating layer of anodized metal material (31, 32) on the main surface of the movable electrode (3) consist of an oxide of the same metal material.

6 Claims, 3 Drawing Sheets

ELECTROSCOPIC FLUID DISPLAY

Figure 1:
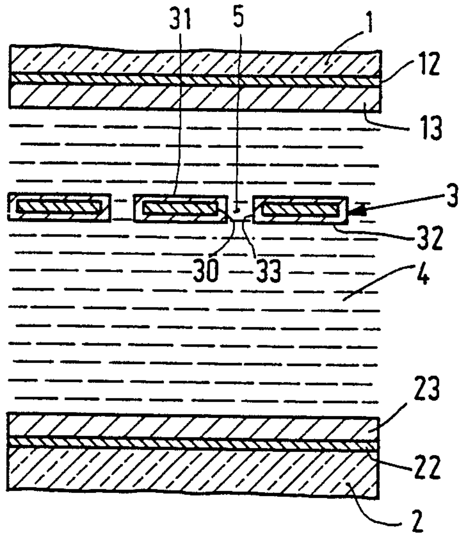

The invention relates to an electroscopic fluid display comprising a lower substrate and a transparent upper substrate which is positioned parallel to the lower substrate by spacer means, the spacer means and the substrates defining a sealed cell space containing a high-impedance contrast liquid and a series of display elements each of which comprise at least one fixed electrode provided on one of the substrates, and a resiliently suspended perforated electrode which can be moved between the substrates, facing surfaces of the electrodes being provided with an insulating layer, the surface of the movable electrode facing the transparent substrate having reflective properties and contrasting with the contrast liquid, and during operation the fluid display is driven by means of the electrodes with an alternating current.

A device of the type mentioned above is described in the non-prepublished Netherlands Patent Application No. 860027, corresponding to U.S. Pat. No. 4,807,967.

In this document a problem with electroscopic fluid displays is described, which consists in that during operation electric charge accumulates in or on the insulating layers due to adsorption of ions, the amount of adsorbed ions increasing in time, also in the case of alternating voltage drive.

The above document also provides a solution for this charge-accumulation problem, namely by using a bare, i.e. having no insulating surface layers, silver movable electrode and fixed electrodes to which a polyimide layer is applied. It has been found, however, that in practice this solution is difficult to implement in particular as regards the lower substrate, since the technology required for the manufacture of an assembly of a lower substrate and movable electrodes annihilates the property of the polyimide that ions formed at the interface between the movable electrode and the non-transparent liquid are not adsorbed at the interface.

It is an object of the invention to provide a workable solution to the known charge-accumulation problem.

This object is achieved by a device as described in the opening paragraph, characterized in that the degree of asymmetry of the alternating voltage drive is adapted to the difference in surface properties as regards charge delivery and charge adsorption of opposing insulating layers, or in that the alternating voltage drive is symmetrical, and opposing insulating layers have substantially the same surface properties as regards charge delivery and charge absorption.

For example, in a strongly injecting insulating layer the driving period can be relatively short, whereas in the case of a small adsorbing opposing insulating layer the driving period can be relatively long. In practice, a symmetrical alternating voltage drive is probably to be preferred.

It is to be noted, that in the above document a description is given of an embodiment in which opposing insulating layers are made of the same material, i.e. silicon oxide, so that the insulating layers may have the same surface properties as regards charge delivery and charge adsorption. However, as is described in the document, the silicon oxide layers are applied to the main surfaces of the movable electrode, which consists of aluminium, to enhance the brightness of the picture to be displayed by the electroscopic fluid display and to provide an additional measure against short circuits between the movable electrode and the fixed electrode. In this connection, reference is made to the prepublished Netherlands Patent Application 84 03 536, in which a description is given of an identical structure having opposing insulating layers consisting of silicon oxide, the layers each being provided with a monolayer of a silane compound which prevents charge adsorption by the respective insulating layer.

In accordance with the present invention, such monolayers of compounds containing, in general, polar and apolar groups are not necessary, while the combination of pairwise opposing identical insulating layers in combination with a pure alternating voltage drive is proposed for the first time as a possible measure to prevent charge accumulation.

An advantageous embodiment of the electroscopic fluid display is characterized according to the invention in that on at least one main surface of the movable electrode the insulating layer consists of anodized metal material of the movable electrode, and the insulating layer continues along the outer and inner peripheral portions of the perforated movable electrode, and in that the insulating layer on the substrate opposite the insulating layer of anodized metal material on the main surface of the movable electrode consists of an oxide of the same metal material.

This is also a solution in which opposing insulating layers are made of the same dielectric material, the dielectric material being obtained on at least one main surface of the movable electrode by anodizing the movable electrode, the apertures of the perforated movable walls determining the electrode and the side walls of the movable electrode also being provided with an insulating layer of anodized electrode metal, such that, as will be obvious, less charge carriers, such as ions, are injected into the contrast liquid in the electroscopic fluid display, which contributes to a reduction of the charge adsorption.

In a preferred embodiment, the movable aluminium electrode including, for example, circular apertures, is embedded in aluminium oxide obtained by anodizing the complete movable electrode, while aluminium oxide layers are applied to both substrates by, for example, sputtering.

Since the movable electrode is provided on at least one of its main surfaces with an insulating layer obtained by anodizing, an additional advantage can be obtained since in the case of a single anodic layer warpage of the movable electrode can be compensated or remedied by adjusting the thickness of the layer and, in the case of a movable aluminium electrode embedded in aluminium oxide the absence of warpage can be maintained.

The invention further relates to a method of manufacturing an electroscopic fluid display by providing a first structured electrode layer on a lower substrate, providing a first insulating layer on the lower substrate which is provided with the first structured electrode layer, providing a polymer layer on the first insulating layer, providing a second insulating layer on the polymer layer, providing a second structured electrode layer on the second insulating layer, selectively etching the second insulating layer using the second structured electrode layer as a mask, underetching the second insulating layer via the second structured electrode layer and, hence, selectively etching the polymer layer, providing an identically structured third insulating layer on the second structured electrode layer, the second structured electrode layer having such a pattern and the underetching being carried out such that a number of rotatable perforated electrodes is obtained which are interconnected by resilient connecting pieces which are supported by respective polymer supports, providing a fourth insulating layer on a transparent substrate and, finally, interconnecting the substrates in a tightly sealed manner, such that the third and the fourth insulating layer contact one another.

Such a method is known from the non-prepublished Netherlands Patent Application stated hereinbefore.

By means of this known method a movable electrode is obtained whose inner peripheral walls and side walls, which determine the apertures in the movable electrode, are not coated with an insulating layer, such that injection of the charge carrier into the contrast liquid may occur.

In accordance with the above stated object of the invention, it is an object to overcome this disadvantage also.

To this end, the invention provides a method of the type described above, which is characterized in that prior to underetching the third insulating layer is applied by anodizing the second structured electrode layer, thus simultaneously providing the side surfaces of the second structured electrode layer with insulating material.

By means of the method proposed, the movable electrode can be made to satisfy the requirement that warpage in a movable electrode of 500×500 μm is at most 5 μm, by adjusting the duration of the anodizing operation. In the case of a silicon oxide layer having a thickness of 250 nm, the thickness of the aluminium oxide layer amounts to approximately 100 nm.

The invention finally provides a method of manufacturing an electroscopic fluid display by providing a first structured electrode layer on a lower substrate, providing a first insulating layer on the lower substrate carrying the first structured electrode layer, providing a polymer layer on the first insulating layer, providing a second structured electrode layer on the polymer layer, underetching the second structured electrode layer and, thus, selectively etching the polymer layer, providing an identically structured second and third insulating layer, respectively, on the two main surfaces of the second structured electrode layer, the second structured electrode layer having such a pattern and the underetching being carried out such that a number of rotatable perforated electrodes is obtained which are interconnected by resilient connecting pieces which are supported by respective polymer supports, providing a fourth insulating layer on a transparant substrate and, finally, interconnecting the substrates in a tightly sealed manner, such that the third and the fourth insulating layer contact one another. This method is also known from the above-mentioned non-prepublished Netherlands Patent Application, and is characterized in that after underetching the second and third insulating layer are provided by anodizing the second structured electrode layer, thus simultaneously providing the side surfaces of the second structured electrode layer with insulating material, such that also the injection of charge carrier from the walls of the perforated movable electrode determining the apertures is avoided. A further advantage is that this method is even more readily proconceivable and that a perforated movable electrode is obtained which is completely embedded in insulating material, the electrode intrinsically satisfying the above mentioned warpage requirement, in particular if, in the case of a square movable aluminium electrode of 500 $\mu m^2$, the thickness of the movable aluminium electrode is at least 1.5 μm.

Anodizing is preferred and is carried out in a solution of ammonium pentaborate in water or glycol at a current density of approximately 0.5 mA per $cm^2$.

Figure 2:
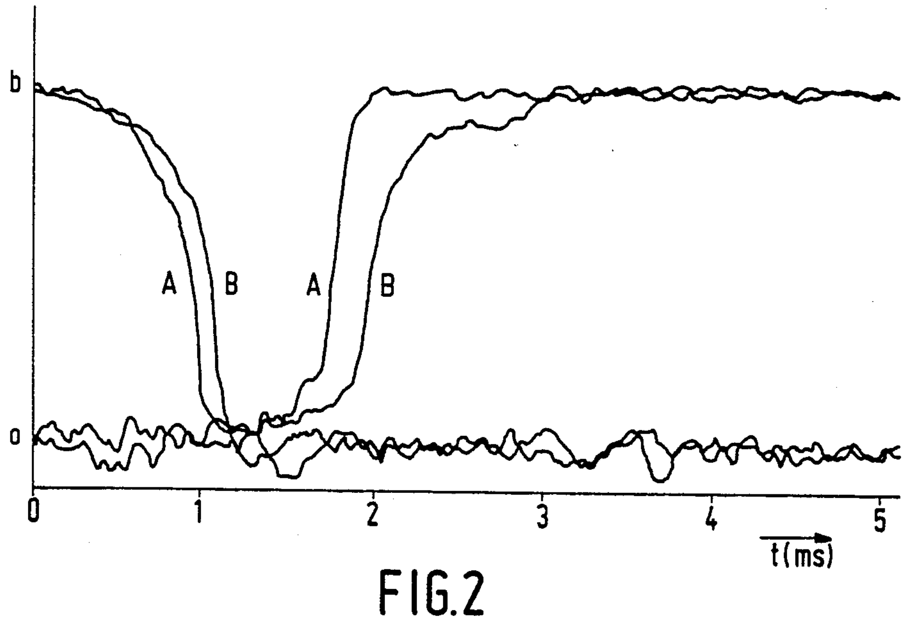
Figure 3A:
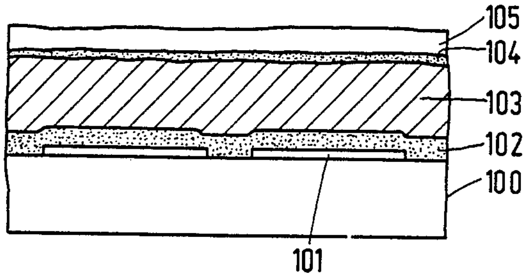
Figure 3B:
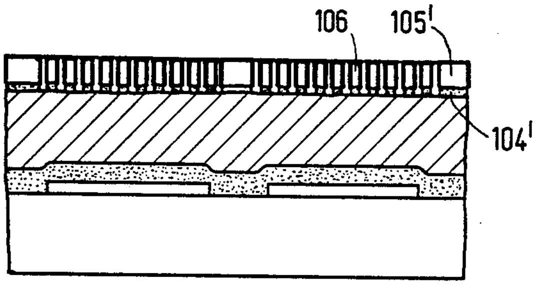
Figure 3C:
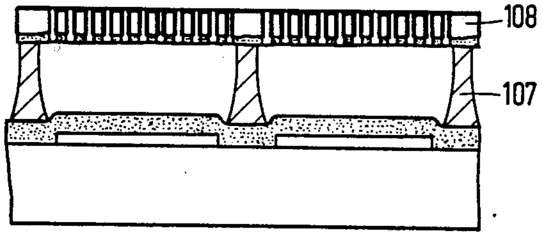

The invention will now be explained in greater detail by means of a drawing, in which FIG. 1 is a detailed sectional view of a preferred embodiment of an electroscopic fluid display according to the invention;

FIG. 2 is a graph for illustrating the reproducible, improved switching properties of the electroscopic fluid display according to the invention;

FIGS. 3A–C show intermediate products of an electroscopic fluid display according to the invention, which are obtained by a method according to the invention; and FIGS. 4A–D show intermediate products obtained by a preferred inventive method of manufacturing an electroscopic fluid display.

Prior to the detailed description of the invention it should be noted that for the various possibilities of constructing an electroscopic fluid display or more generally a passive display device reference is made to the relevant literature, in particular the prepublished Netherlands Patent Applications 84 02 201 and 84 02 536, and the non-prepublished Netherlands Patent Application 860027, as well as the literature mentioned therein.

FIG. 1 is a diagrammatic view on an enlarged scale of only that portion of the electroscopic fluid display which is of importance for the illustration of the invention, more in particular a small portion of a movable perforated electrode 3, which is also called reflector, and a small portion of a transparent substrate 1 and lower substrate 2 cooperating therewith. In the space between the substrates 1, 2 there is a high-impedance contrast liquid 4, for example a solution of blue anthraquinone colourant in mesitylene, which contrasts with the reflector 3.

As is known from the relevant literature, an electroscopic fluid display, a small portion of which is shown in FIG. 1, comprises apart from the lower substrate 2 and the transparent substrate 1 spacers (not shown in this drawing) supporting the substrates 1, 2 such that they are parallel to each other. These spacers, together with the substrates 1, 2, further define a sealed cell space containing the high-impedance contrast liquid 4. The high-impedance contrast liquid 4 contains a number of display elements; FIG. 1 only shows a small part of a single display element. Each display element is provided with at least one fixed electrode 12, 22 of, for example, indium tinoxide, which is provided on one of the substrates 1, 2. In FIG. 1, both substrates 1, 2 are provided with a fixed electrode 12, 22, more specifically, they are provided, respectivily, with a common planar electrode 12 and a series of columns or rows of fixed electrodes 22, or conversely (see the referenced literature). Each display element further comprises a resiliently suspended perforated electrode 3 which is movable between the substrates 1, 2, more specifically, a series of rows or columns of movable electrodes 3. Reference numeral 5 denotes the apertures in the movable electrode 3. If only one substrate, 1 or 2, is provided with one fixed electrode, resetting of the reflector 3 to the rest position can be carried out by means of mechanical instead of electric means (not shown). The facing surfaces of the electrodes, i.e. the lower surface the electrode 12 and the upper main surface of the reflector 3, and the lower main surface of the reflector 3 and the upper surface of the fixed electrode 22, respectively, are provided with an insulating layer 13, 31 and 32, 23, respectively. The surface of the movable electrode 3 facing the transparent substrate 1 has reflecting properties and contrasts with the high-impedance contrast liquid 4, while the insulating layer 31 is transparent. During operation of the electroscopic fluid display, it is alternating current driven (see referenced literature) by means of the electrodes 12, 3 and 22. So far the electroscopic fluid display need not be different from an electroscopic fluid display as described in or known from the literature mentioned herein before.

However, if an asymmetrical alternating voltage drive is used to operate the electroscopic fluid display, the voltage is adapted to the difference in surface properties as regards charge delivery and charge adsorption of opposing insulating layers 13, 31 and 32, 23, respectively, i e. the position of the zero crossing of the alternating voltage is determined to be so fixed in each period and/or the amplitude of the two half-cycles is selected to be so different that the charge delivery and charge adsorption of facing insulating layers 13, 31 and 32, 23 respectively, are in balance with one another such that on or in these insulating layers 13, 31, 32, 23 no net charge accumulation takes place. If opposing insulating layers have substantially identical surface proporties as regards charge delivery and charge adsorption, a alternating voltage drive having an infinitely small asymmetry can be applied, i.e. a symmetrical alternating voltage drive. The facing insulating layers 13, 31 and 32, 23 respectively, do not have to be made of the same material nor, if they are of the same material, do they have to be applied in the same manner.

Preferably, also the inner peripheral walls 30 of the reflector 3, which determine the apertures, are provided with an electrically insulating layer 33 just like the outer periphery (not shown in FIG. 1) of the reflector 3, so that the reflector 3 does not contain exposed metal parts and, hence, injection of charge carriers into the high-impedance contrast liquid 4 is prevented, although in general this does not exclude charge injection into the contrast liquid 4.

Since there are no signs of charging in the electroscopic fluid display according to the invention, the display has reproducible and suitable switching properties which will surely remain intact. It is important that this is true for both the upper and the lower half of the electroscopic fluid display, whereas in the case of the described embodiment having polyimide on the fixed electrode, the original non-adsorbing behaviour of the polyimide was partly annihilated in the lower half by the necessary technological steps, so that due to the charge adsorption thus caused the charging phenomenon reoccured. So far no technology has been developed to prevent such an attack of the polyimide surface.

In plain words, the present invention proposes to make use of materials having substantially the same surface properties as regards charge delivery and charge adsorption, and to drive this combination with an alternating voltage. In practice this means that the reflectors 3 also have to be provided with an insulating dielectric 31, 32. Since the upper half and the lower half of the electroscopic fluid display are electrically separated, not all four surfaces 13, 31, 32, 23 must have the same surface properties as regards charge delivery and charge adsorption; they only have to be equal pairwise, i.e. 13, 31 and 32, 23, respectively. It is emphasized, that also in the case of significantly differing surfaces properties, in the above-mentioned sense, charge accumulation can be prevented, namely as has been stated before by driving the display with, for example, an asymmetrical square wave voltage, the asymmetry of which is adjusted to the difference in surface properties. However, this might be less practical when this difference varies per display and, hence, has to be adjusted separately for each display.

FIG. 2 shows switching curves obtained by measuring. The position of the reflector 3 is plotted as a function of time, use being made of a symmetrical square wave voltage of 40 V at a frequency of 1 kHz. In the case of curves A no charge accumulation has taken place because the display was not energized until 10 ms before $t=0$. During this time the reflector 3 is moved from its neutral position (nonenergized display) to one of the two final positions. In the case of the curves B the charge accumulation is saturated. This is obtained by applying a voltage to the display for $10^4$ s prior to $t=0$. The small displacement between the curves A and B denotes that the charge accumulation level is very low. In FIG. 2 the final positions, in particular the upper and the lower position are indicated by b and o, respectively.

With respect to FIG. 1 it should be observed that the aluminium reflector 3 is embedded in anodic aluminium oxide, while on the fixed electrodes 12 and 22 aluminium oxide is provided by, for example, vapour deposition or sputtering.

Methods of manufacturing an electroscopic fluid display according to the invention will be described hereinbelow.

In FIG. 3A, a substrate, namely the lower substrate, is indicated by reference numeral 100. A first structured electrode layer comprising a number of first fixed electrodes 101 is provided on the lower substrate 100, by first vapour-depositing electrode material, for example indium tinoxide, onto the lower substrate 100, then applying a photolacquer layer, structuring the layer, and subsequently subjecting the layer of electrode material to a wet chemichal etching process, and removing the photolacquer. A first insulating layer 102 is provided, for example by plasma deposition of silicon oxide, on the first fixed electrodes 101. A polymer layer 103 is provided on the first insulating layer 102, for example by applying and subsequently curing of a photolacquer. Subsequently, the polymer layer is roughened and a second insulating layer 104 is provided, for example, again by plasma depositing silicon oxide (plasma-reinforced chemical vapour deposition, PCVD). To obtain the intermediate product shown in FIG. 3A, a second layer 105 of electrode material, for example aluminium, is provided on the second insulating layer 104 by, for example, vapour deposition.

Subsequently, both the second electrode layer 105 and the second insulating layer 104 are structured by first coating the second electrode layer 105 with a photolacquer and exposing it, after which the second electrode layer 105 is subjected to a wet chemical etching process, by means of the photolacquer shown, and the photolacquer is removed, and by means of the second electrode layer 105' (FIG. 3B), which is structured now, the second insulating layer 104 is plasmaetched causing the second insulating layer 104', which is structured now, to have the same pattern as the structured electrode layer 105', the latter then being anodized, causing the intermediate product shown in FIG. 3B to be obtained, the third insulating layer obtained by anodizing the structured second electrode layer 104' being indicated by reference numeral 106. In this way, the third insulating layer 106 is provided by anodizing the second structured electrode layer 105', such that the side surfaces of the second structured electrode layer 105' are simultaneously provided with insulating material.

Subsequently, the second structured electrode layer 105' which is embedded on the one side by the structured second insulating layer 104' and on the other side by the structured third insulating layer 106, is underetched and, thus, the polymer layer 103 is etched selectively, thereby forming polymer supports 107 (FIG. 3C), which support respective resilient connecting pieces 108 (FIG. 3C), which resilient connecting pieces 108 interconnect rows or columns of movable electrodes (3, FIG. 1) and simultaniously permit movement of each movable electrode between the fixed electrodes (1, 2 FIG. 1). (For further details reference is made to, for example, the above-mentioned non-prepublished Netherlands Patent Application 86007). In this way, by the above-described process steps, a lower half of an electroscopic fluid display according to the invention is obtained as an intermediate product, a schematic detailed view of which is shown in FIG. 3C.

A preferred embodiment of a method according to the invention will now be described with reference to FIGS. 4A–D.

Figure 4A:
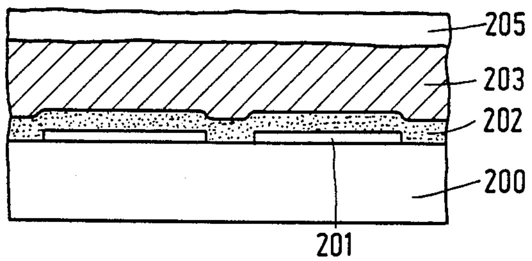

With reference to FIG. 4A, a layer of electrode material, for example indium tinoxide, possibly in combination with aluminium, is vapour deposited on the lower substrate 200 which consists of, for example, B 270 glass. This layer of electrode material is then structured photolithographically by means of a $FeCl_3/HCl$ solution, thus obtaining a first structured electrode layer 201 which comprises, for example, the column electrodes of the display. Subsequently, a first insulating layer 202 is provided on the first structured electrode layer 201 by, for example, high-frequency sputtering of aluminium oxide making use of a source (sputter cathode) of aluminium oxide and argon as the sputtering gas, the thickness of the aluminium oxide layer 202 being, for example, 1 $\mu$m. Subsequently, a polymer layer 203 is provided on the first insulating layer 202, for example, by providing a photolacquer, for example AZ 4620 A, on the rapidly rotating first insulating layer and then drying this photolacquer, after which the polymer layer 203 is limited to the area in which polymer supports have to be formed by removing the photolacquer, and the remaining photolacquer in the active area being cured at a temperature of, for example, 200° C. A roughened layer (not shown) is then provided on the free surface of the polymer layer 203 by again providing photolacquer, for example HPR204 on the rapidly rotating free surface and then drying it, after which it is subjected to a $CF_4/O_2$ plasma treatment and cured at a temperature of, for example, 200° C. Subsequently, a second layer of electrode material 205, in this case aluminium, is provided on the surface of this roughened layer by vapour depositing an aluminium layer having a thickness of, for example, 1.5 $\mu$m at, for example, room temperature. Since the surface of the HPR 204 layer on the polymer layer 203 is rough, also the top surface of the aluminium layer 205 will be rough, as is schematically shown in FIG. 4A.

Figure 4B:
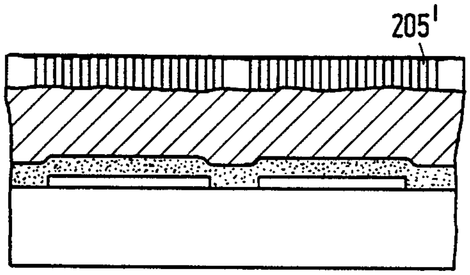
Figure 4C:
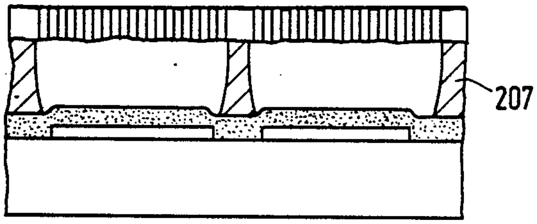
Figure 4D:
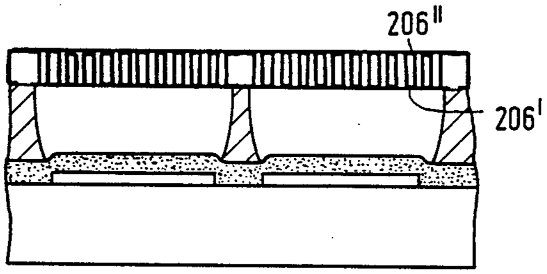

The aluminium layer 205 is then structured photolithographically by means of an etchant, for example $H_3PO_4/HAc/HNO_3/H_2O$, thus forming a second structured electrode layer 205' (FIG. 4B) which must finally provide the movable perforated electrodes (FIG. 1, 3) which in the present case form the row electrodes of the display. The relevant intermediate product is shown in FIG. 4B. Starting from this intermediate product, the second structured electrode layer 205' is underetched and, thus, the polymer layer 203 is etched selectively in order to obtain the polymer supports 207, as in the case of the method described hereinbefore; see FIG. 4C. Underetching is carried out using an oxygen plasma in a drum reactor. Subsequently, the second structured electrode layer 205 is anodized on both main surfaces to obtain a second and a third insulating layer which are indicated in FIG. 4D by reference numerals 206' and 206'', respectively, and in this way the side surfaces of the second structured electrode layer 205' are simultaniously provided with insulating material, in this case $Al_2O_3$, which means that all free surfaces of the movable perforated electrodes 3 (FIG. 1) are provided with an aluminium oxide layer, i.e. the movable perforated electrodes 3 are embedded in insulating, dielectric material. Finally, in order to obtain the lower half of the display, the intermediate product shown in FIG. 4D is rinsed and dried in an ethanol soxhlet apparatus. To complete the manufacture of the display, an upper half is used which is manufactured by providing a fourth insulating layer (not shown) (see FIGS. 1, 13) by, for example, high-frequency sputtering of a 1 $\mu$m thick aluminium oxide layer on a transparent substrate (not shown) which may consist of a substrate of B 270 glass onto which indium tinoxide has been vapour deposited, which substrate is used in the present example as a common upper electrode which, is transparent of course. The aluminium oxide layer is of course provided on the indium tinoxide layer.

Finally, the upper half and the lower half are interconnected using a mylar/araldite adhesive, for example for three hours at a temperature of 150° C. Ultimately, the display is heated in a vacuum up to 150° C. and after cooling it is filled with, for example, a solution of anthraquinone colourant in mesitylene as a contrasting liquid.

Anodizing the aluminium reflectors 3 (FIG. 1), as described above, is preferably carried out in an ammonium pentabozate/ethylene glycol solution. A solution of ammonium pentaborate in water may alternatively be used.

As regards the inventive method described with reference to FIGS. 3A–C, it can be observed that the first insulating, silicon dioxide layer 102 can be applied by plasma deposition at a temperature of for example 300° C., making use of a system of parallel plates. Also in this case the layer thickness is, for example, 1 $\mu$m. In the same way the second insulating, silicon oxide layer 104 can be applied by means of a plasma, but at a temperature of, for example, 175° C. and with a layer thickness up to 0.3 $\mu$m. Like the method described by means of FIGS. 4A–D, in the present method the fourth insulating layer (not shown) of an upper half (not shown) of the display is made of aluminium oxide.

Referring back to FIG. 1, it is preferred according to the invention, as stated hereinbefore, that the movable perforated electrodes 3 are provided on at least one main surface with an anodic insulating layer 31, 32, because in this case al side surfaces of the movable electrodes 3 are simultaniously provided with an anodic insulating layer 33 of dielectric material, which results in that injection from the metal material of the movable electrode 3 into the liquid 4 is prevented.

If the movable electrodes 3 consist of for example a sandwich of in succession a bottom layer of silicon oxide having a thickness of, for example, 250 nm, an intermediate layer of vapour deposited aluminium having a thickness of for example 1 μm and an upper layer of silicon oxide having a thickness of, for example, again 250 nm, the movable electrodes are much more warped after they have been set free by etching, i.e. after underetching than in the case that the sides of the square movable electrodes 3 have a dimension of 500 μm, in which case warpage is 5 μm.

By providing the upperside of the movable electrodes 3 with an aluminium oxide skin by means of anodizing, instead of providing an insulating upper layer of silicon oxide obtained by plasma reinforced chemical vapour deposition, compensation of the warpage of the movable electrodes 3 becomes possible by adapting the oxidic layer thickness thereto. Normally, the movable electrodes 3 are concave. The movable electrodes are straightened by an increase in volume due to conversion of the metal material of the movable electrodes 3 into an oxide. In the case of thick oxidic layers the movable electrodes are convex. Since the thickness of the oxide can be accurately adjusted, for example 1.3 nm/V, movable electrodes 3 can be obtained having a flatness which for the dimensions of the movable electrodes mentioned hereinbefore is at most 5 μm. Moreover, anodic oxide layers have suitable insulating properties.

To obtain the at least partly anodized movable electrodes 3, the second structured electrode layer 105 is anodized, before setting free the electrodes by etching, in accordance with the method described with reference to the FIGS. 3A–C, in a solution of 2% ammonium pentaborate in water or in a solution of 17% ammonium pentaborate in glycol. The current density used is approximately 0.5 mA/cm$^2$. The thickness of the oxide layer applied is adapted to the thickness of the silicon dioxide layer and amounts to approximately 100 nm at a thickness of the silicion oxide layer of 250 nm.

In accordance with the presently preferred inventive method described with reference to FIGS. 4A–D, and which is based on a movable electrode 3 of aluminium without a silicon oxide bottom layer, the movable electrodes 3 can be provided entirely with an anodic oxide skin in the above-described manner, after loose etching they have been set free by etching. In this case, and taking into account the above-described size of the movable electrode 3, the thickness of the aluminium layer must be at least 1.5 μm to obtain a surface curvature of at most 5 um.

What is claimed is:

1. An electroscopic fluid display comprising a first substrate, a second transparent substrate spaced from said first substrate, spacer means for positioning said second substrate parallel to said first substrate, a sealed cell space disposed within said spacer means and said substrates, a high-impedance contrast liquid disposed in said cell space, a plurality of display elements, each of said display elements including at least one fixed electrode disposed on at least one of said substrates and at least one resiliently suspended perforated movable electrode disposed for movement between said substrates, said electrodes having facing surfaces provided with an insulating layer, said movable electrode having a surface with reflective properties facing said transparent substrate, said surface with reflective properties contrasting with said contrast liquid, means for driving said electrodes with alternating current, said means driving said electrodes with an asymmetric alternating voltage having a degree of asymmetry corresponding to a difference in surface properties of said insulating layer of said facing electrode surfaces relative to charge delivery and charge absorption at said facing electrode surfaces, wherein said movable electrode has at least one main surface where said insulating layer consists of anodized metal material of said movable electrode, said insulating layer continuing along inner and outer peripheral portions of said perforated movable electrode, and wherein said insulating layer on the substrate opposite to said anodized metal material on said movable electrode consists of an oxide of the same metal material.

2. An electroscopic fluid display comprising a first substrate, a second transparent substrate spaced from said first substrate, spacer means for positioning said second substrate parallel to said first substrate, a sealed cell space disposed within said spacer means and said substrates, a high-impedance contrast liquid disposed in said cell space, a plurality of display elements, each of said display elements including at least one fixed electrode disposed on at least one of said substrates and at least one resiliently suspended perforated movable electrode disposed for movement between said substrates, said electrodes having facing surfaces provided with an insulating layer, said movable electrode having a surface with reflective properties facing said transparent substrate, said surface with reflective properties contrasting with said contrast liquid, means for driving said electrodes with alternating current, said means driving said electrodes with a symmetrical alternating voltage, wherein opposing insulating layers have substantially the same surface properties for charge delivery and charge absorption at said facing electrode surfaces, wherein said movable electrode has at least one main surface where said insulating layer consists of anodized metal material of said movable electrode, said insulating layer continuing along inner and outer peripheral portions of said perforated movable electrode, and wherein said insulating layer on the substrate opposite to said anodized metal material on said movable electrode consists of an oxide of the same metal material.

3. An electroscopic fluid display as claimed in either claim 1 or claim 2, in which the movable electrode is of aluminium, characterized in that the movable electrode is embedded in aluminium oxide.

4. An electroscopic fluid display as claimed in either claim 1 or claim 2, in which the insulating layer on a main surface of the movable electrode consists of silicon oxide, characterized in that the thickness of the insulating layer of anodized metal material on the other main surface of the movable electrode is selected so that warpage of the movable electrode is compensated by the increase in volume brought about by conversion of the metal material of the movable electrode into metal oxide by anodizing.

5. An electroscopic fluid display as claimed in claim 4, in which the movable electrode is of aluminium, characterized in that on the movable electrode the thickness of the silicon oxide layer is approximately 250 nm and the thickness of the aluminium oxide layer is approximately 100 nm.

6. An electroscopic fluid display as claimed in claim 3, characterized in that the width and the length of the movable aluminium electrode are each equal to 500 μm and in that the thickness of the movable aluminium electrode is at least 1.5 μm.

* * * * *